June 4, 1963    S. A. DENMAN    3,092,143
INTERMITTENT PULSE VALVE CONTROL SYSTEM
Original Filed Sept. 16, 1957
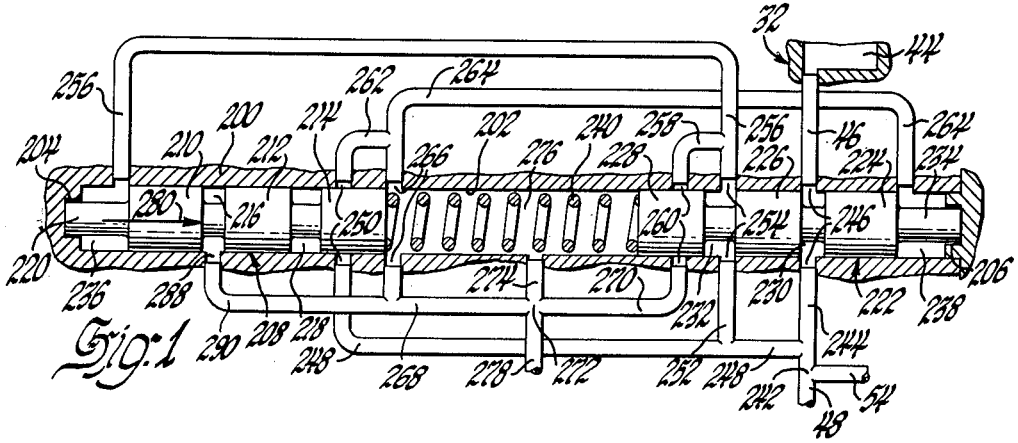
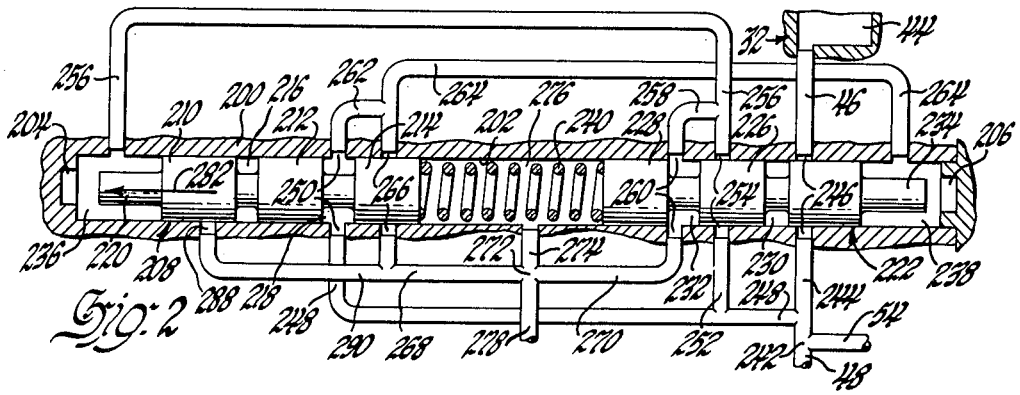
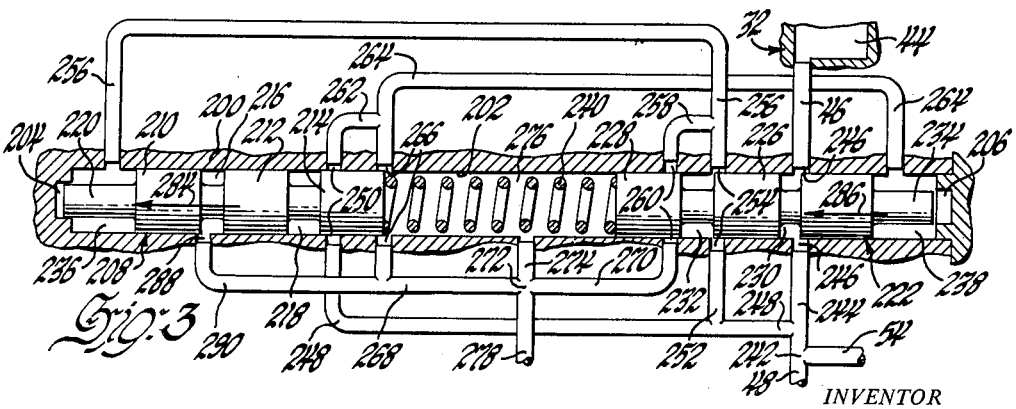
INVENTOR
Stephen A. Denman
BY
D. D. McGraw
ATTORNEY United States Patent Office 3,092,143
Patented June 4, 1963

3,092,143
INTERMITTENT PULSE VALVE CONTROL
SYSTEM
Stephen A. Denman, Piqua, Ohio, assignor to General Motors Corporation, Detroit, Mich., a corporation of Delaware
Application Nov. 5, 1958, Ser. No. 772,014, now Patent No. 3,052,217, dated Sept. 4, 1962, which is a division of application Ser. No. 684,154, Sept. 16, 1957, now Patent No. 2,976,946, dated Mar. 28, 1961. Divided and this application Mar. 1, 1961, Ser. No. 92,662
4 Claims. (Cl. 137—624.14)

This application is a division of United States application S.N. 772,014 filed November 5, 1958, now Patent No. 3,052,217, which was a division of U.S. application S.N. 684,154 filed September 16, 1957, now Patent No. 2,976,-946.

The invention relates to a system for establishing intermittent pulses in a hydraulic control system and more particularly to such a system in a mechanism which is hydraulically controlled and actuated.

Previous mechanisms have been proposed which use a hydraulic pressure proportional to a variable parameter which may be desired to be kept substantially constant. Such mechanisms in the past have not been entirely satisfactory in operation, however, since a hysteresis effect was found to exist which contributed to undesirable hunting of the mechanism in the general range of the preselected constant parameter value. The mechanism now proposed overcomes these objections by use of a reference pressure to establish the preselected parameter value with the reference pressure being applied to a sensing valve to act as a no-rate spring. Hysteresis effect of the sensing valve as well as that of the mechanism is reduced by providing a series of sharp pressure pulses through the substantially constant reference pressure system instead of an absolutely constant pressure application. This may be accomplished by providing a pulse producing system including a pair of oppositely disposed balancing valves acting on a common spring. While it is desirable to maintain the pulse frequency within limits in order to retain the overall effect of a substantially constant reference pressure, the pulses are operative to reduce the hysteresis effect primarily due to the amplitude of the pulses produced. A mechanism embodying the features of the invention herein disclosed and claimed is operative to maintain accurate control within a desirable range without objectionable hysteresis effects.

In the drawings:

FIGURES 1, 2 and 3 illustrate a balancing valve pulse-producing system embodying the invention herein claimed.

Main line pressure from a suitable source may be modified to a reference pressure and directed to chamber 44 through conduit 48 and pulse valve 50. The main line pressure may be regulated to become the reference pressure by a suitable reference pressure regulator valve mechanism in the manner disclosed in the above noted patent. Regulation of such a valve mechanism establishes the reference pressure within conduit 46 and chamber 44 and the preselected parameter value of the control mechanism is thereby determined.

The balancing or pulse valve arrangement is shown in operational sequence in the drawing. It operates to produce the intermittent pulses in reference pressure conduit 46 and chamber 44. The valve assembly includes a valve housing 200 in which an axially extending cylindrical valve chamber 202 is formed. The ends of valve chamber 202 are respectively provided with recesses 204 and 206 of generally cylindrical form and of smaller diameter than chamber 202. Valve 208 is positioned in one end of chamber 202 and is formed to include spaced lands 210, 212 and 214 separated by annular grooves 216 and 218. Valve 208 is also provided with an axially extending reduced end 220 which is receivable within recess 204 to provide a dashpot action. Valve 222 is received within the other end of chamber 202 and is provided with spaced lands 224, 226 and 228 defining annular grooves 230 and 232. The valve is provided with an axially extending reduced end 234 which is receivable within recess 206 to provide a dashpot action. Either the recesses 204 and 206 or the reduced ends 220 and 234, or all of them, may be slightlly tapered, if desired, to give a variable dashpot action. Valves 208 and 222 are preferably identical, with the valves being disposed to each other within chamber 202 in mirror image relation.

Reduced valve ends 220 and 234 cooperate with housing 200 and lands 210 and 224, respectively, to define end chambers 236 and 238. The adjacent ends of the valves are spaced axially apart and have compression spring 240 received between them within chamber 202 and acting against the ends of lands 214 and 228. Fluid under pressure is received through conduit 48 and is preferably main line pressure. Conduit 54 connects with a suitable reference pressure regulator mechanism such as that disclosed in the above noted patent and joins conduit 48 at junction 242. Main line pressure is modified to reference pressure at this point. Passage 244 leads from this junction to the port 246 in the balancing valve mechanism adjacent valve 222. When groove 230 of valve 222 is aligned with port 246, the fluid pressure is connected with reference pressure conduit 46 and is transmitted to reference pressure chamber 44 of mechanism 32.

Passage 248 leads from passage 244 and connects with port 250 adjacent valve 208. Passage 252 is connected with passage 248 and leads to port 254 which is adjacent valve 222 and axially inwardly spaced from port 246. Passage 256 leads from port 254 to end chamber 236. Passage 258 connects passage 256 with port 260 which is adjacent but axially inwardly spaced from port 254. Passage 262 connects port 250 with passage 264. Passage 264 connects the port 266, which is axially inwardly spaced from and adjacent port 250, with the end chamber 238. Port 266 is connected with port 260 by passages 268 and 270, at the juncture 272 of which is connected passage 274, leading from the center chamber 276, and the drain passage 278. Drain passage 268 is also connected with port 288 by passage 290.

The sequence of operations is shown in order in FIGURES 1, 2 and 3. FIGURE 1 shows valve 222 at the extreme right-hand end of chamber 202 with groove 230 fully connecting passage 244 to conduit 46 through port 246. Reference pressure passes through passages 248 and 252, port 254, groove 232 and passage 256 to end chamber 236. This pressure acts on one side of land 210 of valve 208. This valve, as indicated by arrow 280, is moving to the right as seen in FIGURE 1. Drain passage 278 is connected with passage 274 through which oil being displaced from center chamber 276 is exhausted as valve 208 moves to the right.

Chamber 238 is also opened to exhaust through passage 264, port 266 and passage 268. As valve 208 moves to the right beyond the point shown in FIGURE 1, land 214 closes passage 264 at port 266 and opens passages 248 and 262 through port 250 and groove 218. Reduced end 220 of valve 208 is removed from recess 204. Line pressure then flows through passage 248, port 250, groove 218 and passages 262 and 264 to end chamber 238. The fluid under pressure in chamber 238 acts on the end of land 224 of valve 222, causing that valve to move to the left.

When starting the system after a period of rest, there may be air in some or all of the lines. If there is air in passage 264 and chamber 238, for example, valve 208 may tend to move so far to the right as to cut off the supply of pressure fluid to chamber 238 before the air is exhausted therefrom. This would result in locking valve 223 in the position shown in FIGURE 1. To obviate this difficulty, port 288 is connected with drain passage by passage 290. When valve 208 continues to move to the right under these circumstances, chamber 236 is opened to drain through port 288 and passage 290 before land 212 completely closes port 250. Thus, fluid pressure may be introduced into chamber 238 and cause valve 222 to be properly actuated.

After a short interval of movement of valve 222 to the left, land 224 closes port 246, thereby disconnecting passage 244 from conduit 46 and interrupting the supply of reference fluid pressure to reference chamber 44. Land 226 also closes port 254 to disconnect passages 252 and 256. As movement of valve 222 continues to the left, groove 232 cooperates with port 260 to connect passages 258 and 270. In the meantime, valve 208 has moved sufficiently to the right, as above described, to permit land 214 to close port 266, thereby disconnecting passages 264 and 268. Groove 218 is also aligned with port 250 to connect passages 248 and 262. Pressure fluid now flows through passage 248, port 250, groove 218 and passages 262 and 264 to end chamber 238, thus continuing to supply that chamber with fluid under pressure to continue to move valve 222 to the left to the inner end of its stroke. This condition is shown in FIGURE 2. At this time end chamber 236 is opened to drain through passages 256 and 258, port 260, groove 232, passages 270 and 278. Since end chamber 236 is opened to exhaust and compression spring 240 is acting against the end of land 234, valve 208 is stopped in its movement to the right and is moved to the left as indicated by arrow 282. Valve 222 is momentarily stopped at its inward position shown in FIGURE 2.

As valve 208 continues to move to the left, the mechanism assumes the position shown in FIGURE 3. Land 214 interrupts port 250 to disconnect passage 248 from passage 262, thereby interrupting the supply of fluid pressure to end chamber 238. Land 214 opens port 266 to connect passage 264 with drain passages 268 and 278, permitting the oil in end passage 238 to be exhausted. Spring 240, acting against land 228 of valve 222, now moves that valve to the right. Land 228 closes port 260 to disconnect passages 258 and 270. Land 226 uncovers port 254 to connect passages 252 and 256 through groove 232. Land 224 uncovers port 246 to connect passage 244 with conduit 46, again permitting reference pressure to be transmitted to chamber 44. Arrows 284 and 286, respectively, indicate the movement of valves 208 and 222. As the valves 208 and 222 approach their outer stroke limits, the reduced ends 220 and 234 enter recesses 204 and 206, respectively. These recesses contain semi-trapped fluid and act as dashpots to slow and stop the outward movement of the valves. As the valves reach their extreme outer limits, the condition shown in FIGURE 1 prevails and the cycle is repeated. It is noted that throughout the cycle, valve 208 leads valve 222 slightly in its reciprocating movements. Thus, the pressure supplied to chamber 44 is pulsed intermittently by hydraulic action and no outside power source is required. The timing of the mechanism may be varied as desired by changing the characteristics of spring 240 and the sizes of various passages as well as the dimensions of the valves themselves.

An intermittent pulse valve control system for a hydraulic control system has been disclosed which will effectively permit control of a desired parameter without the usual hunting or hysteresis effects characteristic of previous hydraulic systems.

I claim:
1. Means for producing pressure pulses in a fluid pressure control system for reducing hysteresis in said system, said means comprising a housing having a longitudinally extending chamber formed therein, a first valve received in one end of said chamber, a second valve received in the other end of said chamber, compressive spring means intermediate said valves, passage means for transmitting fluid pressure to intermediate portions of said valves and from one of said valves to said fluid pressure system, and means including ports and passages controlled by said valves for transmitting fluid pressure from the intermediate portions of said valves to the outer ends of each of said valves and for venting the outer ends of each of said valves in timed relation whereby said valves are caused to reciprocate in said valve chamber in opposite directions thereby causing said one valve to intermittently interrupt the supply of fluid to said fluid pressure system to cause pressure pulses in said fluid pressure system.

2. Means for producing pressure pulses in a fluid pressure control system for reducing hysteresis in said system, said means comprising a housing having a longitudinally extending chamber formed therein, a first valve received in one end of said chamber and having three lands separated by two grooves and a radially reduced outer end section whereby two groove-formed chambers and inner and outer valve end chambers are provided, a second valve received in the other end of said chamber and formed and positioned in mirror-image relation to said first valve, compressive spring means intermediate said valves in the inner end chamber therebetween, passage means for transmitting fluid pressure to said valves and from one of said valves to said fluid pressure system through one of said groove-formed chambers, and means including ports and passages controlled by said valves for transmitting fluid pressure to and venting the outer end chambers of each of said valves in timed relation whereby said valves are caused to reciprocate in said valve chamber in opposite directions thereby causing said one valve to intermittently interrupt the supply of fluid to said fluid pressure system to cause pressure pulses in said fluid pressure system.

3. Means for producing pressure pulses in a fluid pressure control system for reducing hysteresis in said system, said means comprising a housing having a longitudinally extending chamber formed therein, a first valve received in one end of said chamber and having three lands separated by two grooves and a radially reduced outer end section whereby two groove-formed chambers and inner and outer valve end chambers are provided, a second valve received in the other end of said chamber, compressive spring means intermediate said valves in the inner end chamber therebetween, passage means for transmitting fluid pressure to said first and second valves and from said first valve to said fluid pressure system, and means including ports and passages controlled by said valve for transmitting fluid pressure and venting to the outer ends of each of said valves in timed relation whereby said valves are caused to reciprocate in said valve chamber in opposite directions thereby causing said one valve to intermittently interrupt the supply of fluid to said fluid pressure system to cause pressure pulses in said fluid pressure system.

4. Means for producing pressure pulses in a fluid pressure control system for reducing hysteresis in said system, said means comprising a housing having a longitudinally extending chamber formed therein, a first valve received in one end of said chamber and having three lands separated by two grooves and a radially reduced outer end section whereby two groove-formed chambers and inner and outer valve end chambers are provided, a second valve received in the other end of said chamber and formed and positioned in mirror-image relation to said first valve, compressive spring means intermediate said valves in the inner end chamber therebetween, passage means for transmitting fluid pressure to said valves and from one of said valves to said fluid pressure system, and means including ports and passages controlled by said values for transmitting fluid pressure to and venting the outer end chambers of each of said valves in timed relation whereby said valves are caused to reciprocate in said valve chamber in opposite directions thereby causing said one valve to intermittently interrupt the supply of fluid to said fluid pressure system to cause pressure pulses in said fluid pressure system, the opposite ends of said valve housing chamber having recesses formed therein and said valves having radially reduced outer end sections cooperating therewith to provide valve deceleration means at the outer ends of the valve reciprocating strokes.

No references cited.